COMMON CABLE COMMUNICATION SYSTEM INCORPORATING ISOLATION DIODES

Filed Aug. 2, 1965 Sheet 1 of 3

INVENTOR
SUNG PAL CHUR
BY Samuel Lindenberg
Abraham Wasserman
ATTORNEYS

COMMON CABLE COMMUNICATION SYSTEM INCORPORATING ISOLATION DIODES

Filed Aug. 2, 1965

INVENTOR
SUNG PAL CHUR
BY Samuel Lindenberg
Abraham Wasserman
ATTORNEYS

INVENTOR
SUNG PAL CHUR
BY Samuel Lindenberg
Abraham Wasserman
ATTORNEYS

United States Patent Office 3,435,415
Patented Mar. 25, 1969

3,435,415

COMMON CABLE COMMUNICATION SYSTEM INCORPORATING ISOLATION DIODES

Sung Pal Chur, Inglewood, Calif., assignor to Data Products Corporation, Culver City, Calif., a corporation of Delaware Filed Aug. 2, 1965, Ser. No. 476,468
Int. Cl. H04g *1/18*
U.S. Cl. 340—163 22 Claims

ABSTRACT OF THE DISCLOSURE

A common cable communication system in which a low characteristic impedance coaxial cable connects a master unit with a plurality of secondary units. The cable incorporates a plurality of diodes which isolate all the secondary diodes, except the one with which the master unit communicates. At any time, only the portion of the cable between the master unit and the secondary unit, which is communicated with, is activated, with the rest of the cable being deactivated by the diodes.

This invention relates to a data transmission system and, more particularly, to an improved communication system wherein data is transferable between a master unit and any one of a plurality of secondary units.

At present, various techniques are employed to transfer data from a master unit to any one of a plurality of secondary or slave units, as well as transfer data from any one of the secondary units to the master unit. In some systems, the master unit is connected by separate data lines or cables to each secondary unit. Such arrangements are unsatisfactory since the wiring becomes very complex, thereby increasing the cost of producing and servicing the systems. Other systems have attempted to reduce the wiring problems by connecting several secondary units along a single communication buss or cable. Herebefore such systems exhibited severe cross-feeding of data between secondary units, which resulted in an unreliable transfer of data to or from a particular secondary unit, particularly at high data transfer rates. Also coupling several secondary units to a common communication line produces substantial shifts in reference potential levels which affect the performance of the prior art systems.

Attempts have been made to overcome the effect of the shifts in the potential levels by transferring the data with high level signals which can be detected despite the shifts in potential levels. Such techniques are known as brute force methods. The use of high level signals for data transfer require high power sources for data transmission, which are generally quite complex and expensive.

A further disadvantage of the prior art system utilizing common transmission cables is the need for special line termination circuitry which is necessary to minimize the problem of data signal reflection in the transmission cables.

Accordingly, it is an object of the present invention to provide a novel communication system wherein information is transferable between a master unit and any one of a plurality of secondary units.

It is another object of the present invention to provide a new common line communication system between a master unit and a plurality of secondary units in which optimum information transmission is attained with low power and current requirements at a high transfer rate unattained in the past.

It is a further object of the present invention to provide a common line communication system for transferring information between a master unit and a plurality of secondary units, with low level signals, unaffected by shifts in reference potential between the various units.

Yet, a further object of the present invention is the provision of a common line communication system in which information may be transferred between a master unit and any one of a plurality of units more efficiently than herebefore possible.

It is a further object of the present invention to provide a common line communication system for transferring information between a master unit and a plurality of secondary units in which signal reflection and information cross-feeding problems present in prior art systems are greatly minimized and substantially eliminated.

These and other objects of the present invention are achieved by providing a common cable communication system in which a coaxial cable of a low characteristic impedance is used to interconnect the master units with a plurality of secondary units. The coaxial cable incorporates a plurality of diodes which are used to isolate all the secondary units, except the one which is to receive the data from the master unit. At any given time, only a portion of the cable necessary to connect the particular secondary unit to the master unit is activated, with the rest of the cable being deactivated by means of the diodes. Thus, the coaxial cable does not only serve as a mere conductor to interconnect the various units. Rather, it performs specific functions in conjunction with the transmitting and receiving stages of the secondary units in order to insure that the data is properly routed between a particular secondary unit and the master unit. The use of the diodes in the coaxial cable provides a novel and simple arrangement for insulating any of the secondary units which are not in communication with the master unit from the rest of the circuitry. Thus, the problems of information cross-feeding present in many present-day systems is substantially eliminated.

Each of the receiving stages includes means capable of providing active line termination for the coaxial cable which is equal to the characteristic impedance of the cable. Thus, the cable is optimally terminated by the particular receiving stage which is enabled to receive data, without requiring special line terminating circuits. Specially designed current drivers and receiver circuits are incorporated to transfer the data by means of low level current signals, thereby minimizing the power dissipation of the driver source.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
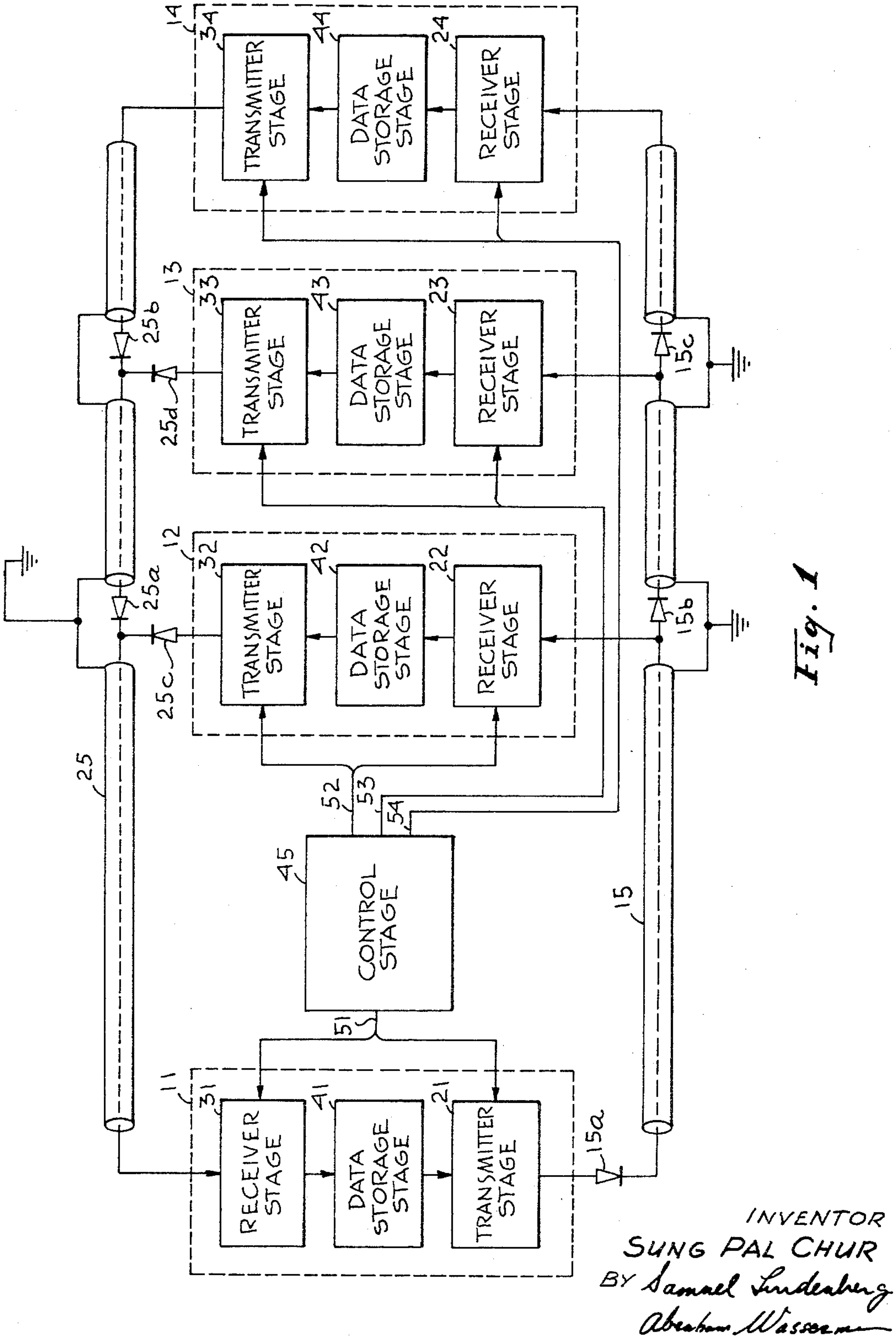
FIGURE 1 is a block diagram of the communication system of the present invention.

Reference is now made to FIGURE 1 which is a simplified block diagram of the communication system of the present invention. A master unit 11 is shown coupled to secondary or slave units 12, 13 and 14. The number of secondary units shown is for explanatory purposes only, it being appreciated that any number of units may be incorporated. A first cable or line 15 interconnects a transmitter stage 21 of the master unit 11 to receiver stages 22, 23 and 24 of secondary units 12, 13 and 14 respectively. Similarly, a second cable 25 interconnects transmitter stages 32, 33 and 34 of units 12, 13 and 14 respectively, to a receiver stage 31 of master unit 11.

Cables 15 and 25 comprises coaxial cables having their shields connected to a reference potential such as ground. A plurality of diodes are connected in series with the central wires or leads of the two cables. In cable 15, used to transfer information from the master unit 11 to each of the secondary units, a diode 15*a* is interposed between the transmitter stage 21 and receiver stage 22. Diodes 15*b* and 15*c* are interposed between receiver stages 22 and 23, and receiver stages 23 and 24 respectively. Similarly, diodes 25*a* and 25*b* are interposed along the central lead of cable 25 between units 12 and 13 and units 13 and 14, with diodes 25*c* and 25*d* isolating units 12 and 13 from the cable 25.

Units 11 through 14 further comprise data storage stages 41 through 44 respectively. Each storage stage is connected to the transmitter and receiver stages of its respective unit so that within each unit, data received by the receiver stage thereof may be stored in the storage stage and data therefrom may be transmitted through its transmitter stage. The novel communication system of the invention also includes a control stage 45 which is connected to units 11 through 14 by control lines 51 through 54 respectively. The function of the stage 45 is to control the enabling or disabling of the various receiver and transmitter stages in order to control the transfer of data between the master unit and any one of the secondary units.

When data is to be transferred from the master unit 11 to one of the secondary units, such as unit 13, the control stage 45, by means of line 51, enables the transmitter stage 21 of the master unit 11 and by means of line 53 enables the receiver stage 23 of unit 13, so that data from stage 41 may be transferred to storage stage 43. Similarly, when data is to be transferred to the master unit 11, receiver stage 31 is enabled as well as the transmitter stage of one of the secondary units (such as stage 33) so that data from the storage stage of one of the secondary units (such as stage 43) is transferred to storage stage 41 of master unit 11. In a preferred embodiment of the invention, the transmitter and receiver stages of master unit 11 are constantly enabled, thus eliminating control line 51. To transfer data to a secondary unit, it is only necessary to enable the proper receiver. Similarly, to transfer data to the master unit, only the transmitter stage of the particular secondary unit need be actuated.

The function of the diodes such as 15*a*, 15*b* and 15*c* coupled to the coaxial cable 15 and diodes 25*a* through 25*d* coupled to cable 25, is to isolate the units not involved in the data transfer and insure that only the units between which the data is transferred are properly interconnected. For example, when data is transferred from master unit 11 to secondary unit 12, only receiver stage 22 is enabled while receiver stages 23 and 24 remain disabled. Consequently, diode 15*b* is back-biased, insulating secondary units 13 and 14 from the transmitter stage 21 of the master unit 11. Thus, the data in the form of current signals is transferred only through the portion of the cable 15 which connects units 11 and 12. The rest of the coaxial cable 15 is electrically insulated from the master unit so that data signals directed to secondary unit 12 cannot be cross fed to secondary units 13 and 14.

Each of coxial cables 15 and 25 has a low characteristic impedance, such as 50 ohms, in order to minimize its size and cost, as well as minimize the voltage drop across the circuitry at which the cable terminates. In accordance with the teachings of the present invention, each receiver stage is designed to include a terminating network which matches the impedance of the line. Since data is transferred to only one receiver stage, the stage itself provides the cable with an optimum terminating network which matches its impedance. Thus, the need to supply a special network to terminate the line which is necessary in prior art systems is eliminated.

Figure 2:
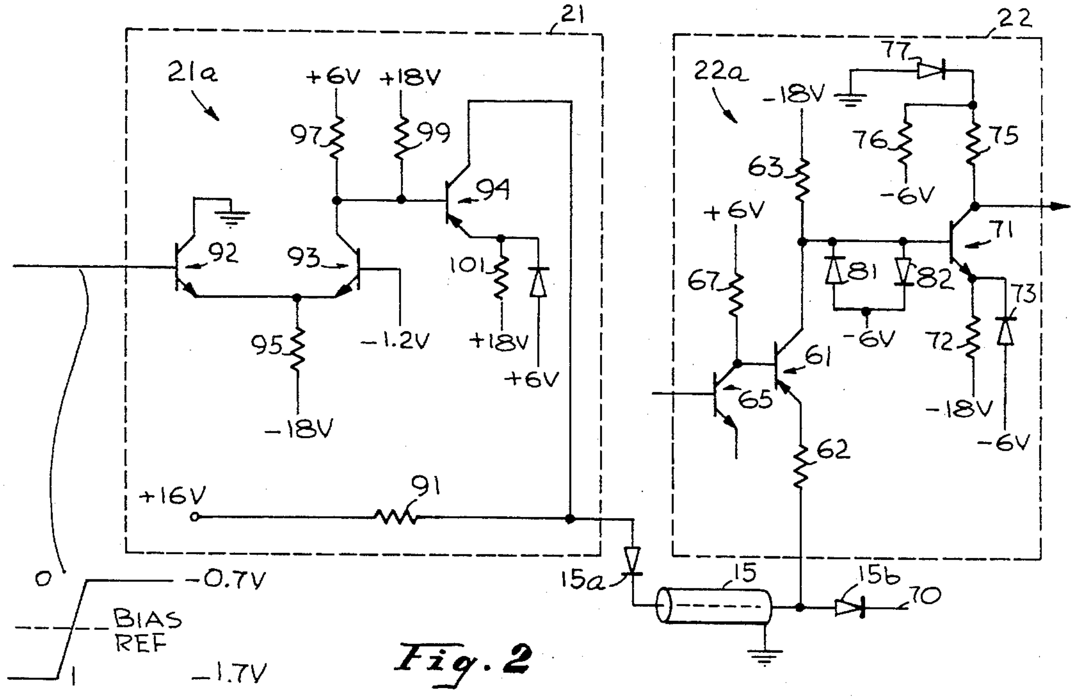
FIGURE 2 is a schematic diagram of the master unit transmitter stage and a secondary unit receiver stage shown in FIGURE 1.

For a better understanding of the mode of operation of the present invention in transferring data from the master unit 11 to any of the secondary units, reference is made to FIGURE 2 in which the transmitter stage 21 of the master unit 11 is shown coupled by means of cable 15 to the receiver stage 22 of secondary unit 12. For explanatory purposes only, stages 21 and 22 are shown comprising of single transmitting and receiving circuits respectively. However as will be explained hereafter in detail, each of the transmitter and receiving stages (FIGURE 1) comprises a plurality of transmitting and receiving circuits. Each of the transmitting circuits of stage 21 is connected to another receiving circuit in each of the receiver stages 22, 23 and 24 by means of a separate coaxial cable, such as cable 15. Similarly, each of the receiving circuits of stage 31 is connected by a separate cable such as cable 25 to another transmitting circuit in each of transmitter stages 32, 33 and 34.

In the system of the present invention, binary data is transferred as current signals, the amplitude of which represents the data. Thus, a binary "1" is represented by a current signal of a first magnitude, supplied from transmitter stage 21 to a select one of the receiver stages and a binary "0" is represented by a current signal of a second magnitude. In the following description, the present invention will be explained in conjunction with specific circuits and signals actually employed in reducing the invention to practice. As seen from FIGURE 2, the receiver stage 22 comprises a receiving circuit 22*a* which includes a receiver input transistor 61 having its collector connected through a resistor 63 to a source of negative potential, such as −18 v. The emitter of transistor 61 is connected through a resistor 62 to cable 15 and the anode of diode 15*b*. The base of transistor 61 is connected to a collector of a receiver enabling transistor 65. The collector of transistor 65 is connected through a resistor 67 to a source of positive potential, such as +6 volts, with the emitter connected to ground. The base of transistor 65 is connected via cable 52 to the control stage 45 (FIGURE 1).

In the embodiment of the invention wherein the transmitter stage 21 of the master unit is permanently enabled, the transmitter stage permanently supplies a small bias current signal in order to forward bias the diodes (15*a*, 15*b* and 15*c*) connected in series with coaxial cable 15. As long as the base of enabling transistor 65 is not raised sufficiently above ground potential, the transistor is disabled, thereby maintaining the collector thereof and the base of input transistor 61 at about +6 volts. Consequently, transistor 61 is in a disabled state. However, when transistor 65 is enabled by a positive signal (from the control stage 45 via lines 52), the base of transistor 61 is pulled to about ground potential. The small bias current from stage 21 is sufficient to maintain the emitter of transistor 61 forward biased so as to provide a low input impedance on the order of 20 ohms. When using a coaxial cable with a characteristic impedance of 50 ohms, resistor 62 is chosen to be about 30 ohms so that transistor 61 and resistor 62 together terminate the cable with its characteristic impedance.

Since resistor 62 is chosen to be of a small value (30 ohms) the anode of diode 15*b* is also at a fraction of a volt above ground. However, the cathode thereof connected to the succeeding, disabled, receiver stage 23 which incorporates a transistor similar to transistor 61, is at a higher potential so that diode 15*b* is backbiased. Consequently, receiver stages 23 and 24 are electrically insulated from the stage 22 which receives the data, as well as from the transmitter stage 21 from which the data is transmitted. Thus, secondary units 13 and 14 are insulated from the master unit 11 so that data transmitted therefrom to unit 12 is prevented from being cross fed to units 13 and 14. The use of the diodes has been found to be extremely advantageous in minimizing noise due to signal reflection in the portion of the cable disabled.

When receiver stage 22 is enabled to receive data, the collector current of transistor 61 becomes a function of the current from the transmitter stage 21, supplied through resistor 62 to the emitter of transistor 61. The collector of transistor 61 is connected to a current discriminating circuit in which the magnitude of the current signal supplied to transistor 61 is determined.

The current discriminating circuit comprises a transistor 71, having an emitter connected through a resistor 72 and a diode 73 to sources of negative potential of 18 volts and −6 volts respectively. The collector of transistor 71 is connected through resistors 75 and 76 to the −6 volts source, with the junction of the resistors being connected to the cathode of a diode 77 whose anode is at ground. The base of transistor 71 is connected to the collector of transistor 61, and to the −6 volt source through parallel oppositely connected diodes 81 and 82.

In operation, resistor 63 is chosen so that as long as the current through the collector of transistor 61 is substantially less than 6 milliamperes, the base of transistor 71 is at several tenths of a volt more negative than −6 volts, backbiasing the transistor. However, when more than 6 milliamperes pass through the collector of transistor 61, the transistor 71 is forward biased. The collector of transistor 71 is connected to the storage stage 42 of unit 12 so that the level of the collector is used to transfer data thereto, as a function of the current signal supplied to transistor 61, which in turn represents the data transmitted from the master unit 11.

In the particular embodiment of the present invention, the transmitter stage 21 provides a bias current of approximately 0.6 milliamperes (ma.) irrespective of the data to be transmitted. If a binary "0" is to be transmitted the current signal remains at 0.6 ma. However, when a binary "1" is to be transmitted the current signal is raised to 10.6 ma. When a current signal of 0.6 ma. is received by stage 22, the transistor 71 remains at approximately zero (0) volt, thereby representing a binary "0" level. On the other hand, when a current signal of 10.6 ma. is received, the level of the collector of transistor 71 falls below −1.2 volt, thereby representing a binary "1." The level of the collector of transistor 71 is used in data storage stage 43 to store the binary data supplied to the receiver stage in the form of current signals of different levels or amplitudes.

As previously stated, in the preferred embodiment of the invention, the transmitter stage is permanently enabled. When so energized, a resistor 91 (FIGURE 2), a transmitting circuit 21*a* of the stage 21 is connected between the anode of diode 15*a*. The magnitude of resistor 91 is chosen to control the bias current to be 0.6 ma. irrespective of the data to be transmitted.

The transmitting circuit 21*a* of transmitter stage 21 also includes a pair of transistors 92 and 93, connected as a differential amplifier. The collector of transistor 93 is connected to a base of a transistor 94. Transistor 94 is forward biased as a function of the signal supplied to the base of transistor 92 which is connected to the data storage stage 41 of master unit 11. The level of the signals from stage 41 represent the binary data to be transmitted. The emitters of transistors 92 and 93 are connected through a resistor 95 to a −18 volt source.

The collector of transistor 92 is connected to ground and the base of transistor 93 is connected to a bias potential, such as −1.2 volt. The collector of transistor 93 and base of transistor 94 are both connected through resistors 97 and 99 to sources of +6 volts and +18 volts respectively. Also, the emitter of transistor 94 is connected through a resistor 101 to the +18 volts source, and through a diode 102 to the +6 volts source.

As long as the potential of the base of transistor 92 is at −0.7 volt which is assumed to represent a binary "0," supplied from stage 41, transistor 92 is forward biased, backbiasing transistor 93 so that the potential of the collector thereof is at about +7 volts. Consequently, transistor 94 is backbiased so that current does not flow through the collector thereof to augment the bias current of 0.6 milliampere provided through resistor 91. Namely, when the signal from stage 41 is a "0," the collector current of transistor 94 is substantially of zero amplitude.

However, when the potential of the base of transistor 92 drops to below −1.1 volt towards −.7 volt which is assumed to represent a "1," transistor 93 is forward biased, dropping the potential of the collector thereof to +5 volts. Consequently, transistors 93 and 94 are forward biased. When transistor 94 is forward biased, a current of approximately 10 milliamperes flows through its collector. This current is added to the bias current of 0.6 ma. so that the total current of the transmitter stage 21 is 10.6 ma.

Thus, the magnitude of the current signal supplied from the transmitter stage 21 to the receiver stage 22 depends on the binary data from data storage stage 41. A current signal of 0.6 milliampere represents a "0" and a signal of 10.6 milliamperes represents a"1." In either case however, the magnitude of the current is quite small so that the power requirements of the system are quite low. This is especially the case when using a coaxial cable of low characteristic impedance which is properly terminated. In each receiver stage, the resistor 62 and the emitter-base input impedance of transistor 61 are selected to be equal to the characteristic impedance of cable 15, so that the cable 15 terminates in an optimum termination impedance. Such an arrangement eliminates the need for separate termination circuitry, greatly reducing signal reflection problems which occur due to improper cable termination.

From the foregoing description, it is thus seen that the communication system of the present invention is operable with relatively low magnitude current signals which account for the low power requirement of the system. The novel use of a low impedance coaxial cable with a plurality of diodes connected in series therewith, greatly reduces the problems of signal cross-feeding between the particular secondary unit to which data is to be transferred and the other secondary units which are deactivated. By activating the particular receiver stage, the diode connected between the stage and all succeeding stages is backbiased so that in essence all succeeding receiver stages are electrically insulated from the part of the common coaxial cable through which the data in the form of current signals is being transferred. Thus, the problem of signal reflection from the portion of cable disabled, is greatly minimized.

The use of current sources which provide a current signal, the amplitude of which represents the transferred data, greatly minimizes the effect of shifts in reference potential between the various units. Shifts of few volts can be tolerated without adversely affecting the operation of the system. In addition, by incorporating impedance means within each receiver stage, which equal the impedance of the coaxial cable, optimum cable termination is provided without the use of additional circuits, generally required in prior art systems. Terminating the cable with its characteristic impedance in the particular unit to which data is transferred improves the performance of the system and substantially eliminates signal reflection problems.

The advantages gained by utilizing a coaxial cable with the plurality of diodes to interconnect the various units for transmitting data from the master unit to a particular secondary unit, are also realized by connecting the receiver stage 31 (FIGURE 1) of the master unit to the transmitter stages of the various secondary units with a coaxial cable (25) intercoupled with a plurality of diodes.

Figure 3:
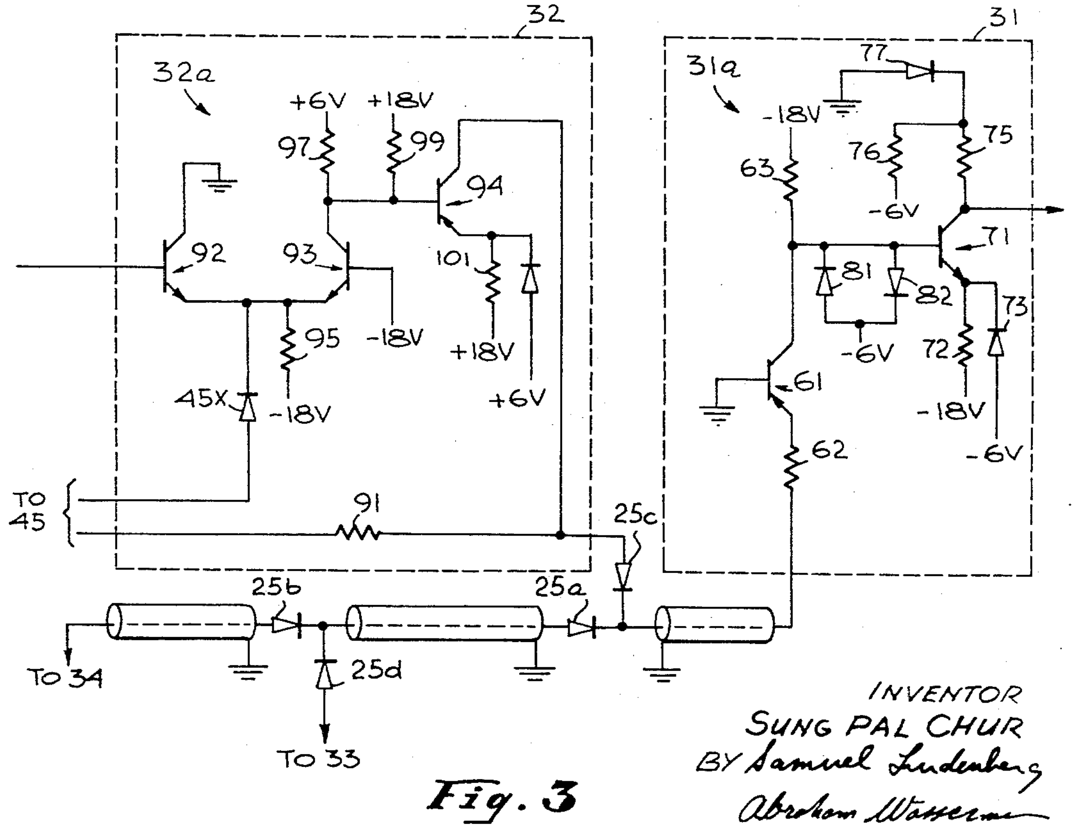
FIGURE 3 is a schematic diagram of a secondary unit transmitter stage and the master unit receiver stage shown in FIGURE 1.

Referring to FIGURE 3, there is shown a receiving circuit 31*a* of the receiver stage 31 of the master unit 11 connected to a transmitting circuit 32*a* of the transmitter stage 32 of secondary unit 12. Transmitter stages 33 and 34 of units 13 and 14 are identical with unit 32. As seen, the transmitting circuit 32a is very similar to the transmitting circuit 21a of the master unit 21 (see FIGURE 2), except that in circuit 32a the resistor 91 is not connected directly to a source of +16 v. Rather, it is connected via control line 52 (FIGURE 1) to control stage 45. Only when stage 32 is to be enabled does the control stage 45 connect resistor 91 to a source of +16 v. in order to supply the small bias current herebefore referred to. However, when stage 32 is disabled, resistor 91 (via line 52) is connected to a source of −6 v., thus inhibiting the bias current. The control stage 45 is also connected through a diode 45x to the emitters of transistors 92 and 93. When the stage 32 is enabled, the anode of diode 45x is connected to an open circuit, but when stage 32 is disabled the emitter through diode 45x are connected to a source of +6 volts. Thus, whereas the transmitter stage 21 of the master unit 11 is permanently enabled, the transmitter stage of each secondary unit is enabled or disabled depending on the signal levels which are supplied to the resistor 91 and transistors 92 and 93 by the control stage 45 via control line 52.

As seen from FIGURE 3, the receiving circuit 31a of stage 31 of the master unit 11 is similar to the receiving circuit 22a (FIGURE 2). However, in circuit 31a the base of the input resistor 61 is permanently connected to ground so that the circuit is always enabled to receive data. Whenever a transmitter stage of a secondary unit, such as stage 32 (FIGURE 3), is enabled, only the portion of the coaxial cable 25 between the particular unit and the master unit is in the circuit, while the rest of the cable becomes isolated therefrom, due to the backbiasing of the diodes connecting the particular unit to succeeding units. For example, when stage 32 (FIGURE 3) is enabled, resistor 91 is connected to a source of +16 volts so that the anode of diode 25c and therefore the junction of the cathodes of diodes 25c and 25a is higher than the potential at the anode of diode 25a, which is connected through diode 25d and a resistor 91 in disabled stage 33 to a source of −6 volts. This, diode 25a is backbiased, isolating the rest of the stages (33 and 34) from the master unit 11 so that the data from enabled stage 32 is transmitted to receiver stage 31. Similarly when data is to be transmitted from stage 33, diodes 25b and 25c are backbiased, isolating stages 34 and 32 respectively from the master unit 11. Consequently, only the portion of the coaxial cable 25 which is between the enabled transmitter stage and the receiver stage 31 is used while the rest of the cable becomes isolated by the backbiasing of one of the diodes. Such an arrangement greatly reduces signal propagation through disabled portion of cable which causes reflection of signal echo to be superimposed on the original signal creating noise.

Although in the foregoing, the various transmitter and receiver stages have been described as comprising a single circuit, each stage may comprise a plurality of circuits each stage may comprise a plurality of circuits each connected through another coaxial cable to the master unit. For example, the transmitter stage 21 (FIGURE 2) may comprise a plurality of transmitting circuits such as the circuit 21a. Similarly, each of the receiver stages of the secondary units may comprise a plurality of receiving circuits, such as circuit 22a (FIGURE 2). A separate coaxial cable is used to connect each transmitting circuit to another receiving circuit in each of the secondary units. Thus, binary data may be transmitted simultaneously along one or more than one coaxial cable. Similarly, the receiver stage 31 and the transmitter stages of the secondary units may comprise a plurality of circuits, so that one or more data can be simultaneously transmitted to the master unit. Therefore, each of cables 15 and 25 (FIGURE 1) is assumed to represent a plurality of cables, each being used to transfer binary data from the master unit to a select secondary unit or from one of the secondary units to the master unit.

As previously stated, in a preferred embodiment the receiver and transmitter stages of the master unit are permanently enabled. Thus, when each stage comprises a plurality of circuits all the circuits are enabled. In the secondary units however, enabling signals must be provided to enable the particular transmitter or receiver stage. In each receiver stage of a secondary unit which includes more than one receiving circuit (see 22a in FIGURE 2) the bases of all the enabling transistors 65 are tied together so that only a single control signal (of +6 volts) from control stage 45 is required to enable all the receiving circuits, regardless of their number. Thus, the number of control lines, such as 52, from the control stage 45 necessary to enable the receiver stage 22 is not increased, irrespective of the number of receiving circuits in the stage.

Similarly, in each of the transmitter stages of the secondary units comprising of a plurality of transmitting circuits (such as 32a in FIGURE 3) all the biasing resistors 91 are tied together so that a single control signal of +16 volts is necessary to provide a bias current from each of the transmitting circuits. Each of the transmitting circuits has a diode 45x through which enabling or disabling signals are provided. Thus the anodes of all the diodes 45x are tied together so that a single control signal may be used to enable or disable all the transmitting circuits.

In the foregoing description, is has been assumed that the control stage 45 enables a receiver stage by providing the bases of its enabling transistors 65 with a voltage level of +6 volts, while a level of zero volts, or open circuit, disables the receiver stage. Similarly, it has been assumed that to disable a transmitter stage, −6 volts is supplied to its biasing resistors 91 and a level of +6 volts is supplied to diodes 45x. To enable the transmitter stage diodes 45x are open ended and a +16 volt signal is supplied to the biasing resistors.

In another embodiment of the present invention, each transmitter and receiver stage of the secondary units includes a permanently enabled input receiving circuit, similar to the circuit 31a shown in FIGURE 3. The current discriminating transistor 71 of the input receiving circuit is connected to a level detection circuit. In each receiver stage, the output of the level detection circuit is connected to the bases of the enabling transistors and in a transmitter stage the level detection circuit has two outputs, one connected to the resistors 91 and the other to the diodes 45x.

The control stage 45 is connected to the input of each permanently enabled input receiving circuit. As long as the current signal from the control stage 45 is about 0 ma., the transistor 71 of the circuit is cut off so that the output of the level detection circuit maintains the stage to which it is connected in a disabling state. However, a control signal from stage 45 of 10 ma., forward biases transistor 71 so that its level detection circuit enables the stage to which it is connected.

Figure 4:
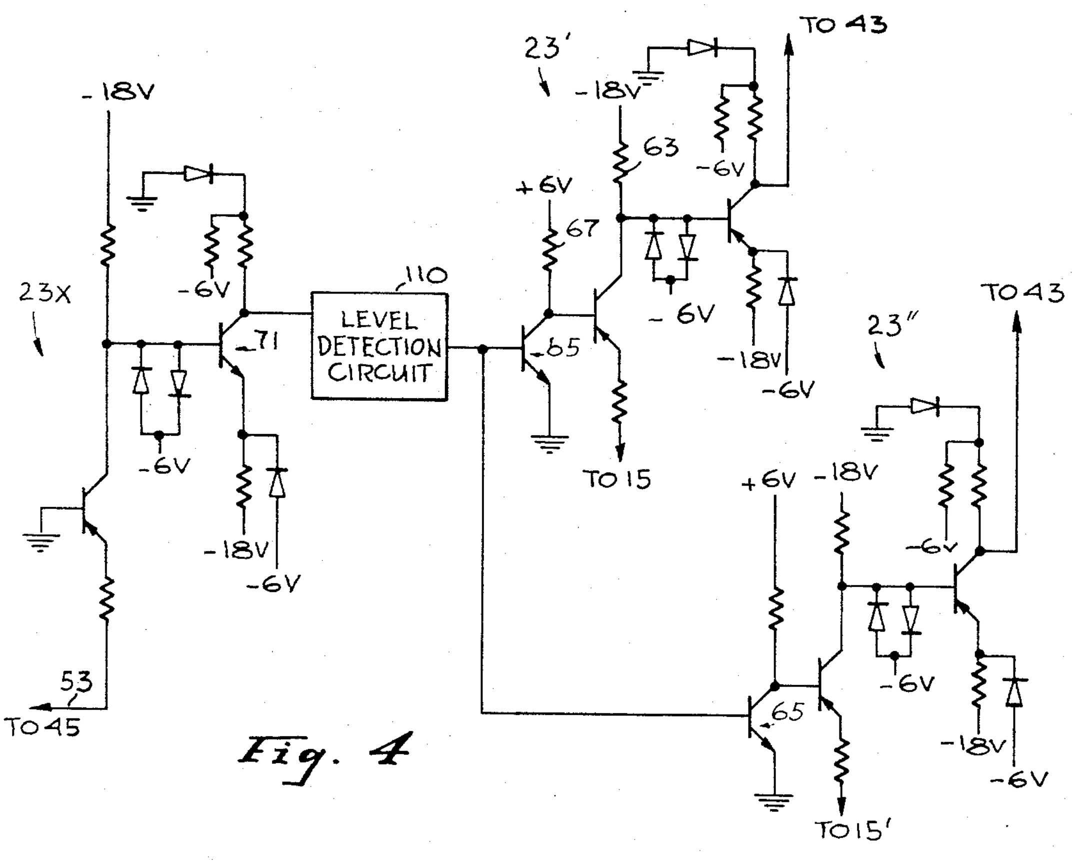
FIGURE 4 is a schematic diagram of another embodiment of a secondary unit receiver stage.

Reference is now made to FIGURE 4 which is a schematic diagram of a receiver stage of a secondary unit such as stage 23. The stage includes two receiving circuits 23' and 23'' which are identical with the circuit 22a of FIGURE 2. The enabling transistors 65 of the circuits 23' and 23'' are tied together and connected to the output of the level detection circuit 110. The stage 23 also includes a permanently enabled input receiving circuit 23x whose input is connected via line 53 to the control stage 45. As long as the current signal from stage 45 is 0 ma., transistor 71 of 23x is cut off, so that the output of 110 is at about ground potential. Thus, transistors 65 remain cut off, disabling circuits 23' and 23''. However, a current signal of 10 ma. from stage 45 forward biases transistor 71 of 23x, so that the output of circuit 110 is +6 volts, thereby enabling receiving circuits 23' and 23''.

Each of circuits 23' and 23" is connected to a separate transmitting circuit in the master unit transmitter stage 21 through a separate coaxial cable. Each coaxial cable is similar to cable 15 herebefore described.

The permanently enabled input receiving circuit in each secondary unit transmitter stage is similar to circuit 23*x* shown in FIGURE 4. However, in the transmitter stages, the level detection circuit 110 instead of having a single output, has two outputs. In response to a control signal of 0 ma. i.e. a disabling control signal, the circuit 110 provides output signals of −6 volts and +6 volts, whereas a +16 volt and an open level output are provided in response to an enabling control signal of 10 ma.

From the foregoing description, it should thus be appreciated that by incorporating a permanently enabled input receiving circuit in each transmitter and receiver stage of each secondary unit, the control stage 45 may selectively enable or disable each stage by providing it with control signals of 10 ma. or 0 ma., rather than the voltage levels of +6 volts or zero volts necessary to control a receiver stage or +16 volts, −6 volts, +6 volts and open circuit necessary to control a transmitter stage. The use of low level control signals is particularly desirable in complex systems with multicontrol leads since the lower levels of the control signals greatly reduce the system's noise and the danger of signal cross feeding which result in system malfunctions.

Figure 5:
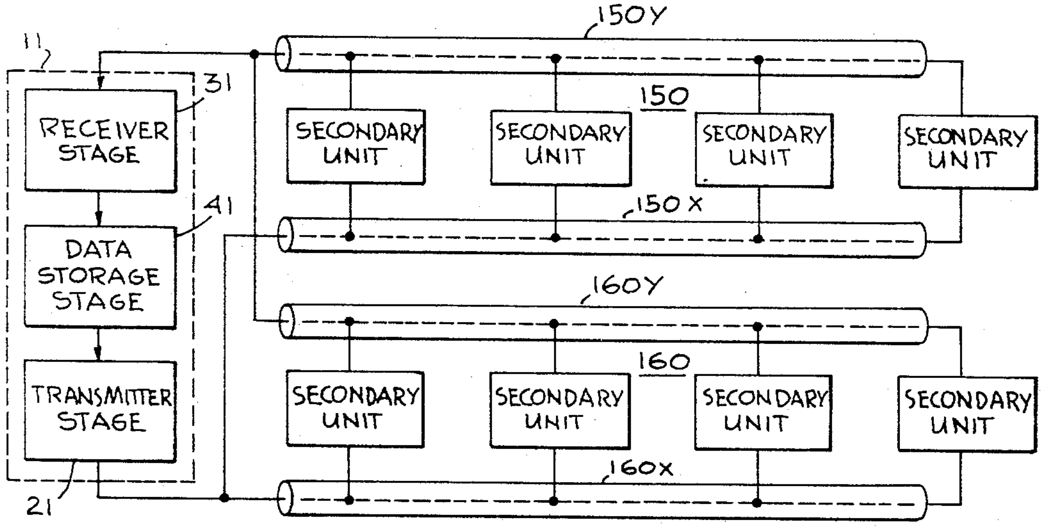
FIGURE 5 is a block diagram of another embodiment of the present invention.

It has been found that the number of secondary units which may be connected in series along a common coaxial cable, such as cables 15 (FIGURE 1) without adverse effects on the system's performance is not unlimited. Best results were achieved when the number of secondary units did not exceed four. However, the number of secondary units which may be satisfactorily operated from a single master unit can be greatly increased beyond four by arranging the units along a plurality of coaxial cables as shown in FIGURE 5 to which reference is made herein. Basically, the secondary units are arranged in groups, two of which, designated by numerals 150 and 160, are shown in FIGURE 5. Each group is shown comprising of four secondary units. In order to simplify FIGURE 5, the various diodes in series with the coaxial cables are not shown. The secondary units in each group operate in a manner identical to that herebefore described. Cables 150*x* and 160*x* are used to transfer data from master unit 11 to one of the secondary units in groups 150 and 160 respectively. Cables 150*y* and 160*y* are used to transfer data from one of the secondary units to the master unit 11.

It should be recalled that at any given time, data is transferred between the master unit and only a single secondary unit which is enabled (either to receive or transmit data). The rest of the secondary units remain in a disabled state, thereby electrically isolating (by means of the various diodes) the coaxial cable coupling them to the master unit from the system. Thus, the fact that the secondary units are interconnected with the master units by a plurality of coaxial cables does not affect the operation of the system, since only the portion of the coaxial cable between the master unit and the selected secondary unit is electrically in the circuit. Yet by arranging the units in groups, many more than four secondary units can be coupled to a single master unit even though only four secondary units are coupled to each coaxial cable.

There has accordingly been shown and described herebefore a novel and useful common line communication system. It should be appreciated that those familiar with the art may make modifications in the specific arrangements as shown. It is apparent that though the invention has been described in conjunction with only three secondary units, any number of secondary units may be incorporated. Also, any known techniques may be employed in selecting the particular secondary unit to which data is transmitted from, or received by, the master unit.

What is claimed is:

1. A data communication system for transferring data between a master unit and one of a plurality of secondary units comprising:

a master unit including transmitting means and receiving means;

a plurality of secondary units each unit including transmitting means and receiving means;

first means for coupling the transmitting means of said master unit to the receiving means of each secondary unit;

second means for coupling the receiving means of said master unit to the transmitting means of each secondary unit; and control means for enabling the receiving means of a selected secondary unit to receive data from the transmitting means of said master unit and isolating the receiving means of the rest of the secondary units from the transmitting means of said master unit, said control means further including means for enabling the transmitting means of a selected secondary unit and isolating the transmitting means of the rest of said secondary units from said receiving means of said master unit, wherein said first and second means comprise first and second cable means and first and second pluralities of biasable means coupled thereto, whereby some of said first plurality of biasable means are backbiased when the receiving means of a selected secondary unit is enabled to isolate the receiving means of the rest of said secondary units from the transmitting means of said master unit and some of said second plurality of biasable means are backbiased when the transmitting means of a selected secondary unit is enabled to isolate the transmitting means of the rest of said secondary units from the receiving means of said master unit.

2. The data communication system of claim 1 wherein said first means comprises first coaxial cable mean having predetermined characteristic impedance and a first plurality of biasable diodes coupled in series with said coaxial cable means, each diode being coupled between receiving means of adjacent secondary units, whereby the diode coupled between the receiving means enabled by said control means and the receiving means of a successive secondary unit is backbiased to electrically isolate the portion of said first coaxial cable means coupling the secondary units succeeding the enabled secondary unit from the transmitting means of said master unit, and wherein said second means comprises coaxial cable means having a predetermined characteristic impedance and a second plurality of biasable diodes coupled in series with siad coaxial cable means, another diode being coupled between transmitting means of adjacent secondary units, whereby the diode coupled between an enabled transmitting means and the transmitting means of a successive secondary unit is backbiased to electrically isolate the portion of said second coaxial cable means coupling the transmitting means succeeding said enabled transmitting means from the receiving means of said master unit.

3. The data communication system of claim 2 wherein each of said receiving means of said secondary units includes impedance means substantially equal to the characteristic impedance of said first cable means and the receiving means of said master unit includes impedance means substantially equal to the characteristic means of said second cable means.

4. The data communication system of claim 1 wherein said secondary units are arranged in a plurality of groups each group including a predetermined number of secondary units, said first means including a plurality of cable means each cable means coupling the receiving means of the secondary units in another group to the transmitting means of said master unit and said second means including a plurality of cable means, each cable means coupling the transmitting means of the secondary units in aonther group to the receiving means of said master unit.

5. A data communication system for transferring data between a master unit and a selected one of a plurality of secondary units comprising:

a master unit including transmitting means receiving means and data storage means coupled to said transmitting and receiving means;

a plurality of secondary units each unit including transmitting means receiving means and data storage means coupled to the transmitting and receiving means of the unit;

first coupling means including first cable means and a first plurality of biasable means for coupling the transmitting means of said master unit to the receiving means of each of said secondary units, each biasable means being coupled in series with said cable means between another pair of adjacent secondary units;

second coupling means including second cable means and a second plurality of bistable means for coupling the receiving means of said master unit to the transmitting means of each of said secondary units, a bistable means of said second plurality being coupled in series with said second cable means between another pair of transmitting means of adjacent secondary units; and control means coupled to the transmitting and receiving means of each secondary unit to said control means for selectively enabling the receiving means of a selected secondary unit to receive data from the transmitting means of said master unit and for selectively enabling the transmitting means of a selected secondary unit to transmit data to the receiving means of said master unit, whereby the biasable means coupled between the enabled receiving means of a secondary unit and the receiving means of a succeeding unit is backbiased to electrically isolate the receiving means of all succeeding secondary units from the transmitting means of said master unit and the biasable means coupled between the enabled transmitting means of said selected secondary units and the transmitting means of a succeeding secondary unit is backbiased to isolate the transmitting means of all the secondary units succeeding said selected secondary unit from the receiving means of said master unit.

6. The system of claim 5 wherein each of said transmitting means includes means for providing a first current signal of a first amplitude as a function of a first bit supplied from the data storage means coupled thereto and a second current signal of a second amplitude as a function of a second bit supplied thereto from said data storage means and each of said receiving means includes input means for receiving said first and second current signals and current discriminating means responsive to said first and second signals for providing to the data storage means coupled thereto first and second output signals respectively, said first output signal being indicative of a first bit and said second output signal being indicative of a second bit.

7. The system of claim 6 wherein the amplitudes of said first and second current signals are of low levels approximately equal to 0.6 milliampere and 10.6 milliamperes respectively.

8. The system of claim 5 wherein said first cable means comprises a coaxial cable having a predetermined characteristic impedance and wherein the receiving means of each of said secondary units includes impedance means substantially equal to the characteristic impedance of said coaxial cable.

9. The system of claim 8 wherein each of said transmitting and receiving means of said secondary units includes an enabling receiving circuit responsive to enabling and disabling control signal from said control means for controlling the enabling and disabling of the particular transmitting or receiving means.

10. The system of claim 9 wherein the amplitudes of said enabling and disabling control signals from said control means are related to the amplitudes of said first and second current signals provided by each transmitting means as a function of the bits supplied thereto.

11. A data transfer system wherein data is transferred from a master unit to any one of a plurality of secondary units comprising:

a master unit including a transmitting stage;

a plurality of secondary units successively arranged in a sequence each having a receiving stage;

a coaxial cable having a predetermined characteristic impedance for coupling said transmitting stage to each of said receiving stages;

a plurality of diodes, each coupled to said coaxial cable, one diode coupled between said transmitting stage and the receiving stage of the first unit in said sequence and each of the other diodes coupled between receiving stages of successive secondary units in said sequence; and means for actuating said transmitting stage and a receiving stage of a selected one of said secondary units to transfer data from said transmitting stage to the receiving stage of said selected unit, whereby the diode connected therebetween and the receiving stage of the succeeding secondary unit being backbiased to deactivate the portion of the coaxial cable connecting said selected secondary unit to the succeeding units and insulate said succeeding units therefrom.

12. A data transfer system for transferring data between a transmitting stage and a receiving stage selected from a plurality of receiving stages arranged in a sequence comprising:

a transmitting stage;

a plurality of receiving stages;

common buss means for coupling said transmitting stage to each of said receiving stages;

means for activating said transmitting stage and a selected one of said receiving stages for transferring data therebetween; and biasable means serially connected between successive stages for electrically decoupling the receiving stages succeeding said selected one receiving stage from said transmitting stage, when said selected receiving stage is activated, wherein said common buss means comprises a coaxial cable having a predetermined characteristic impedance, and wherein each of said receiving stages includes impedance means substantially equal to said characteristic impedance.

13. A data transfer system as recited in claim 12 wherein said biasable means connected between said selected one receiving stage and the succeeding stage thereof is backbiased wherein said selected receiving stage is activated to electrically deactivate a portion of the common buss means coupling the receiving stages succeeding said selected receiving stage, and insulate the succeeding stages from said transmitting stage.

14. A data transfer system for transmitting data between a transmitting stage and a receiving stage selected from a plurality of receiving stages arranged in a sequence comprising:

a transmitting stage;

a plurality of receiving stages;

a coaxial cable having a predetermined characteristic impedance for coupling said transmitting stages to each of said receiving stages, each receiving stage including impedance means substantially equal to said characteristic impedance;

a plurality of biasable means each connected in series with the coaxial cable between another pair of successive stages; and means for activating said transmitting stage to transmit data and for selectively activating one of said receiving stages to receive said data whereby said coaxial cable terminates in the impedance means in said selectively activated receiving stage, and the biasable means connected between said activated receiving stage and a succeeding stage is backbiased to deactivate a portion of the common buss means coupling the receiving stages succeeding said activated receiving stage, and insulate the succeeding stages from said transmitting stage.

15. A data transfer system as recited in claim 14 wherein said transmitting stage includes means for providing a current signal having a first magnitude for transmitting a first bit of data, said signal having a second magnitude for transmitting a second bit of data, each of said receiving stages including current sensitive means for discriminating between said first and second magnitudes of said current signal.

16. In a data storage system of the type wherein data is transferred between a master unit and one secondary unit selected from a plurality of secondary units arranged in a sequence, each unit including a transmitting stage, a receiving stage and a data storing stage, said system further including means for energizing the transmitting stage of said master unit and the receiving stage of said one secondary unit, said system further including means for energizing the receiving stage of said master unit and the transmitting stage of said one secondary unit to transfer data from said one secondary unit to said master unit, the improvement comprising:

a first coaxial cable having a predetermined characteristic impedance coupling the transmitting stage of said master unit to the receiving stage of each of said secondary units;

a first plurality of biasable elements connected in series with said first coaxial cable, each biasable element connected between adjacent successive units, whereby the biasable means between the receiving stage of said one receiving stage to which data is transferred from said master unit is backbiased to electrically insulate the receiving stages of successive secondary units from said one secondary unit and said master unit;

a second coaxial cable; and a second plurality of biasable elements, connected in series with said second coaxial cable, each element connected between adjacent successive units to electrically insulate the transmitting stages of secondary units succeeding said one secondary unit from which data is transferred to said master unit from the best of the secondary units and said master unit.

17. In a data transfer system as recited in claim 16 wherein each transmitting stage includes a means for providing a current signal having a first magnitude for transmitting a first bit of data, said signal having a second magnitude for transmitting a second bit of data, each of said receiving stages including current sensitive means for discriminating between said first and second magnitudes of said current signal.

18. In a data transfer system as recited in claim 16 wherein each of said receiving stages of said secondary units includes impedance means substantially equal to the predetermined characteristic impedance of said first coaxial cable for terminating said cable in its characteristic impedance, and wherein the receiving stage of said master unit includes impedance means to match the characteristic impedance of said second coaxial cable when data is transferred to said master unit from said one secondary unit.

19. In a data transfer system as recited in claim 18 wherein each transmitting stage includes a means for providing a current signal having a first magnitude for transmitting a first bit of data, said signal having a second magnitude for transmitting a second bit of data, each of said receiving stages including current sensitive means for discriminating between said first and second magnitudes of said current signal.

20. A data transfer system for transferring data between data between a master unit and one secondary unit selected from a plurality of secondary units arranged in a sequencing comprising:

a master unit including a data storage stage and a transmitting stage connected to said data storage stage to transfer data therefrom, a plurality of secondary units arranged in a sequence, each secondary unit including a storage stage and a receiving stage connected to the storage stage to transfer received data thereto;

a first coaxial cable of predetermined characteristic impedance connecting said transmitting stage of said master unit to each of said receiving stages;

a plurality of diodes connected in series with said first coaxial cable, each diode being connected between receiving stages of adjacent secondary units; and control means for activating said transmitting stage and one receiving stage of a selected one of said secondary units to transfer data from the storage stage of said master unit to the storage stage of said selected secondary unit, said transmitting stage including means for producing a current signal of a first magnitude in response to a first bit of data from the storage stage of said master unit, and a current signal of a second magnitude in response to a second bit of data, said receiving stage of said selected secondary unit including receiver input means for receiving said current signal of said first magnitude or said second magnitude, and for backbiasing the diode connected between said selected secondary unit and a succeeding secondary unit to electrically insulate the succeeding secondary unit and secondary units succeeding thereof from said selected secondary unit, and said master unit, said receiving stage further including discriminating means for discriminating between said first and second magnitudes of said current signal to provide a signal to the storage stage of said selected secondary unit to store either said first bit or said second bit as a function of the magnitude of the current signal discriminated therein.

21. A data transfer system as recited in claim 20 wherein said master unit includes a receiving stage and each secondary unit includes a transmitting stage, said system further including a second coaxial cable of predetermined characteristic impedance connecting the receiving stage of said master unit to the transmitting units of said secondary units, and a second plurality of diodes connected in series with said coaxial cable each connected between adjacent secondary units, for electrically insulating secondary units succeeding one of the secondary units selected to transfer either a first bit or a second bit of data to said master unit from said selected secondary unit and said master unit.

22. A data transfer system as recited in claim 21 wherein each receiving stage of said secondary units includes impedance means substantially equal to the characteristic impedance of said coaxial cable and the receiving unit of said master unit including impedance means substantially equal to the characteristic impedance of said second coaxial cable.

References Cited

UNITED STATES PATENTS

| | | | |
|---|---|---|---|
| 2,694,802 | 11/1954 | Terry et al. | 340—163 |
| 3,099,818 | 7/1963 | Murray | 340—147 XR |

DONALD J. YUSKO, *Primary Examiner.*

U.S. Cl. X.R.

340—176